United States Patent
Isoda

(10) Patent No.: US 7,491,949 B2
(45) Date of Patent: Feb. 17, 2009

(54) RADIATION IMAGE CONVERSION PANEL AND PROCESS FOR PRODUCING THE SAME

(75) Inventor: Yuji Isoda, Ashigara-kami-gun (JP)

(73) Assignee: FUJIFILM Corporation, Tokyo (JP)

( * ) Notice: Subject to any disclaimer, the term of this patent is extended or adjusted under 35 U.S.C. 154(b) by 29 days.

(21) Appl. No.: 11/822,795

(22) Filed: Jul. 10, 2007

(65) Prior Publication Data
US 2008/0006780 A1    Jan. 10, 2008

(30) Foreign Application Priority Data
Jul. 10, 2006  (JP)  ............... 2006-188911

(51) Int. Cl.
*G03B 42/08*  (2006.01)
*G21K 4/00*  (2006.01)
(52) U.S. Cl. ................ 250/484.4; 250/483.1
(58) Field of Classification Search ............ 250/484.4, 250/483.1
See application file for complete search history.

(56) References Cited

U.S. PATENT DOCUMENTS 4,437,011 A * 3/1984 Noji et al. ............ 250/486.1
7,372,045 B2 * 5/2008 Kondo et al. ............ 250/483.1
2003/0160187 A1 * 8/2003 Nakano et al. .......... 250/484.4
2004/0007676 A1   1/2004 Iwabuchi et al.
2004/0149932 A1   8/2004 Nakano et al.

FOREIGN PATENT DOCUMENTS

| EP | 1 359 204 A1 | 11/2003 |
|---|---|---|
| JP | 2003-302498 A | 10/2003 |
| JP | 2004-3955 A | 1/2004 |
| JP | 2004-233067 A | 8/2004 |
| JP | 2005-98716 A | 4/2005 |

* cited by examiner

*Primary Examiner*—David P Porta
*Assistant Examiner*—Mindy Vu
(74) *Attorney, Agent, or Firm*—Sughrue Mion, PLLC

(57) ABSTRACT

The radiation image conversion panel includes a substrate and a phosphor layer of columnar crystals formed on the substrate by vapor-phase deposition, with a column diameter distribution of the columnar crystals having two or more peaks. The process for producing a radiation image conversion panel prepares a substrate on which two or more types of projections different in diameter are formed and satisfies Expression "$0.4R \leq r \leq 0.8R$" where R is a diameter of a largest projection and r is a diameter of any one of the remainder in the two or more types of projections, thereby making a surface of the substrate uneven and forms a phosphor layer on the uneven surface of the substrate by vapor-phase deposition.

4 Claims, 9 Drawing Sheets

RADIATION IMAGE CONVERSION PANEL AND PROCESS FOR PRODUCING THE SAME

BACKGROUND OF THE INVENTION

The present invention relates to a radiation image conversion panel that has a phosphor layer such as a stimulable phosphor layer formed by a vapor-phase deposition technique such as vacuum evaporation and achieves excellent sensitivity and sharpness, and a process suitable for producing the radiation image conversion panel.

Upon exposure to a radiation (e.g. X-rays, α-rays, β-rays, γ-rays, electron beams, and ultraviolet rays), certain types of phosphors known in the art accumulate part of the energy of the applied radiation and, in response to subsequent application of exciting light such as visible light, they emit photostimulated luminescence in an amount that is associated with the accumulated energy. Called "storage phosphors" or "stimulable phosphors", those types of phosphors find use in medical and various other fields.

A known example of such use is a radiation image information recording and reproducing system that employs a radiation image conversion panel having a film (or layer) of the stimulable phosphor (which is hereinafter referred to as a "phosphor layer"). The radiation image conversion panel is hereinafter referred to simply as the "conversion panel" and is also called the stimulable phosphor panel (sheet). The system has already been commercialized by, for example, FUJIFILM Corporation under the trade name of FCR (Fuji Computed Radiography).

In that system, a subject such as a human body is irradiated with X-rays or the like to record radiation image information about the subject on the conversion panel (more specifically, the phosphor layer). After the radiation image information is thus recorded, the conversion panel is scanned two-dimensionally with exciting light to emit photostimulated luminescence which, in turn, is read photoelectrically to yield an image signal. Then, an image reproduced on the basis of the image signal is output as the radiation image of the subject, typically to a display device such as a CRT display or on a recording material such as a photosensitive material.

The conversion panel is typically prepared by the following method: Powder of a stimulable phosphor is dispersed in a solvent containing a binder and other necessary ingredients to make a coating solution, which is applied to a panel-shaped support (substrate) made of glass or a resin, with the applied coating being subsequently dried.

As described in the patent documents to be referred to below, also known are conversion panels which are prepared by forming a phosphor layer on a substrate through vapor-phase deposition techniques (vacuum film deposition techniques) such as vacuum evaporation and sputtering. The phosphor layer formed by such vapor-phase deposition has superior characteristics in that it is formed in vacuo and hence has low impurity levels and that being substantially free of any ingredients other than the stimulable phosphor as exemplified by a binder, the phosphor layer has not only small scatter in performance but also features very highly efficient luminescence.

A phosphor layer formed by vapor-phase deposition may often have a columnar crystal structure formed of columnar phosphor crystals. Various studies and propositions have been made to improve the characteristics of a conversion panel having a phosphor layer formed by vapor-phase deposition.

To be more specific, JP 2003-302498 A refers to manufacture of a conversion panel having a phosphor layer of columnar crystals formed by vapor-phase deposition and discloses that proper control of the temperature of a substrate during the formation of the phosphor layer enables the phosphor layer formed to have a suitable column diameter and to be substantially uniform, whereby the thus obtained conversion panel can be of high image quality.

JP 2004-233067 A discloses a similar conversion panel that has 50 to 4,000 columnar crystals per 100 μm$^2$ of phosphor layer surface to achieve excellent photostimulated luminescence characteristics (luminescence intensity) and high sharpness.

JP 2005-98716 A discloses a similar conversion panel that has a variation coefficient in columnar crystals of up to 50% and preferably up to 40% to achieve high sensitivity and less unevenness in the luminance of the photostimulated luminescence. EP 1359204 A also discloses a similar conversion panel having a variation coefficient in columnar crystals of 0.05 to 0.3.

JP 2004-3955 A discloses a similar conversion panel which has a substrate whose surface is made uneven by a large number of protruding portions and in which columnar crystals are grown only from the protruding portions to be optically isolated from each other, thus achieving high sharpness.

SUMMARY OF THE INVENTION

The conversion panels disclosed in those documents feature satisfactory sensitivity, photostimulated luminescence characteristics and sharpness.

However, the requirements for the characteristics of conversion panels and particularly for their sensitivity and sharpness have become stricter than ever before and it is desired to produce conversion panels having more satisfactory sensitivity and sharpness.

An object of the present invention is to solve the conventional problems as described above by providing a radiation image conversion panel which has a phosphor layer of columnar crystals formed by vapor-phase deposition and achieves high sensitivity and sharpness.

Another object of the present invention is to provide a process for producing the radiation image conversion panel.

In order to achieve the above objects, the present invention provides a radiation image conversion panel comprising:

a substrate; and a phosphor layer of columnar crystals formed on the substrate by vapor-phase deposition, with a column diameter distribution of the columnar crystals having two or more peaks.

The two or more peaks of the column diameter distribution preferably satisfy Expression:

$$0.4R \leq r \leq 0.8R$$

wherein R is a column diameter at a largest column diameter peak and r is a column diameter at any one of the remainder in the two or more peaks of the column diameter distribution. The phosphor layer preferably comprises a stimulable phosphor represented by a general formula "CsBr:Eu".

The present invention also provides a process for producing a radiation image conversion panel comprising the steps of:

preparing a substrate on which two or more types of projections different in diameter are formed and satisfies Expression "$0.4R \leq r \leq 0.8R$" where R is a diameter of a largest projection and r is a diameter of any one of the remainder in the two or more types of projections, thereby making a surface of the substrate uneven; and forming a phosphor layer on the uneven surface of the substrate by vapor-phase deposition.

The radiation image conversion panel having the features described above according to the present invention has a structure in which two or more types of columnar crystals which are different in diameter exist to achieve high sensitivity and satisfactory sharpness (an image is reproduced with high sharpness).

The radiation image conversion panel production process of the present invention enables radiation image conversion panels having such satisfactory characteristics to be produced in a consistent manner.

DETAILED DESCRIPTION OF THE PREFERRED EMBODIMENTS

On the pages that follow, the radiation image conversion panel and the process for producing the radiation image conversion panel according to the present invention are described in detail with reference to the preferred embodiments depicted in the accompanying drawings.

Figure 1:
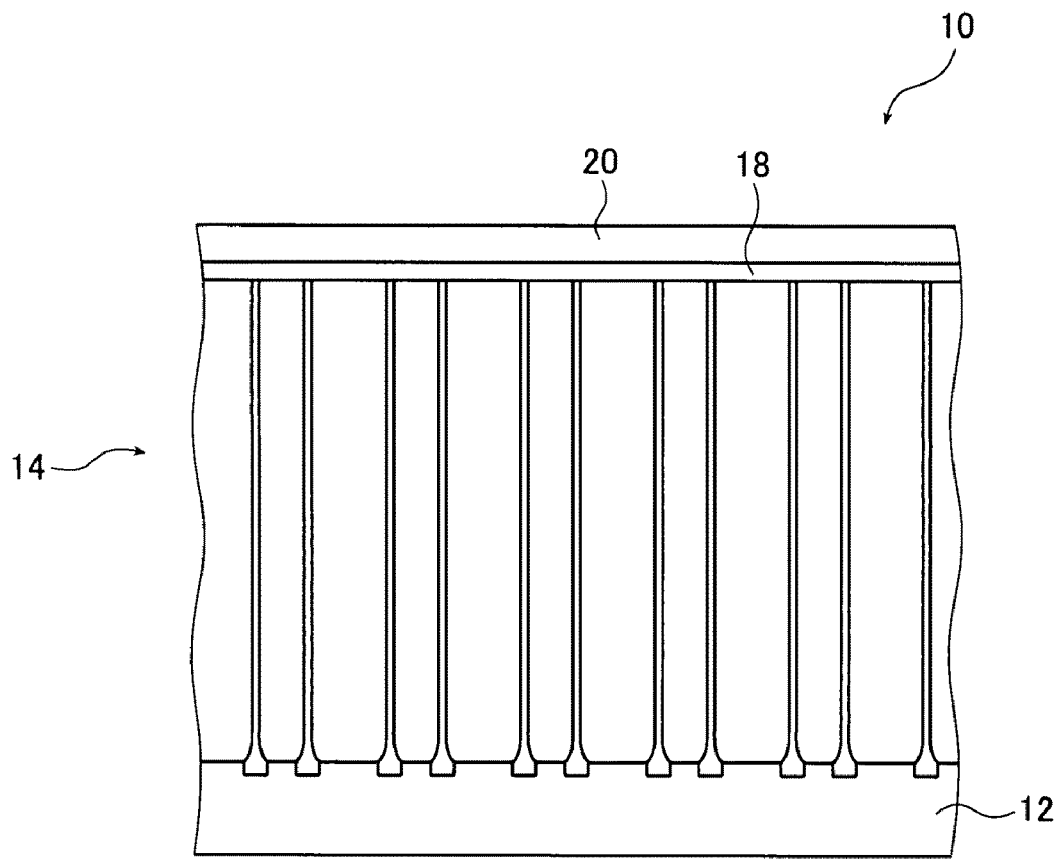
FIG. 1 is a schematic diagram of an embodiment of a radiation image conversion panel of the present invention.

FIG. 1 shows in concept an embodiment of the radiation image conversion panel of the present invention.

A radiation image conversion panel of the present invention which is generally indicated by 10 (hereinafter referred to as a "conversion panel 10") comprises a substrate 12, a phosphor layer 14, and a protective layer 20 entirely covering the phosphor layer 14 to hermetically seal it. In the illustrated case, the phosphor layer 14 and the protective layer 20 are preferably bonded together by an adhesive layer 18.

There is no particular limitation on the structure of the radiation image conversion panel of the present invention but various structures may be used as long as the phosphor layer 14 has a columnar crystal structure formed by vapor-phase deposition and the diameter distribution of columnar crystals fulfills the conditions to be described below.

For example, the adhesive layer 18 and the protective layer 20 may be omitted if the phosphor layer 14 has adequate moisture resistance. The protective layer 20 may be only bonded to the substrate 12 (or a frame member 32 to be described later) with the adhesive layer 18 instead of bonding together the protective layer 20 and the phosphor layer 14 such that the phosphor layer 14 may be covered and sealed with the protective layer 20.

There is no particular limitation on the substrate 12 of the conversion panel 10 of the present invention but various types as used in conventionally known radiation image conversion panels are usable.

Exemplary types include plastic plates and sheets (films) made of, for example, cellulose acetate, polyester, polyethylene terephthalate, polyamide, polyimide, triacetate, and polycarbonate; glass plates and sheets made of, for example, quartz glass, alkali-free glass, soda glass, heat-resistant glass (e.g., Pyrex™); metal plates and sheets made of metals such as aluminum, iron, copper and chromium; and plates and sheets obtained by forming a coating layer such as a metal oxide layer on the surfaces of such metal plates and sheets.

If desired, the substrate 12 may have on its surface a protective layer (protective layer for protecting the base body of the substrate 12), a reflective layer that reflects photostimulated luminescence, and even a protective layer that protects the reflective layer. In this case, the phosphor layer 14 is formed on top of these layers.

As will be described later in detail, the substrate 12 used in the production process of the present invention has an uneven surface including a large number of columnar projections with two or more different diameters, and satisfies the following Expression:

$$0.4R \leq r \leq 0.8R (0.4 \leq r/R \leq 0.8)$$

wherein R is the diameter of the largest projection and r is the diameter of another projection.

The conversion panel 10 shown in FIG. 1 is produced by the production process of the present invention, and a substrate in which projections with two different diameters are formed on the whole surface to make the surface uneven is used for the substrate 12.

In the conversion panel 10 of the present invention, the phosphor layer 14 is formed by a vapor-phase deposition technique such as vacuum evaporation and basically has a columnar crystal structure including columnar crystals isolated from each other.

In the conversion panel 10 shown in FIG. 1, the columnar crystals grow from the surface of the substrate 12. However, this is not the sole case of the present invention.

To be more specific, there are many cases where, in a phosphor layer formed by vacuum evaporation, particularly the one formed of a stimulable phosphor and in particular of an alkali halide-based stimulable phosphor to be described later, crystals initially grow in a spherical shape and further grow in a columnar shape to form columnar crystals according to the conditions under which the phosphor layer 14 is formed (conditions of film deposition). In such a case, the conversion panel 10 of the present invention may have a structure in which a spherical crystal layer having aggregated spherical crystals is formed on the surface of the substrate 12 and a columnar crystal layer is formed thereon.

In the case where crystals grow in a spherical shape as described above, depending on the forming conditions of the phosphor layer 14, the spherical crystals very often stick to the surface of the substrate 12 to form aggregates (domains) before columnar crystals grow, and the columnar crystals are then formed from the domains. In such a case, the conversion panel 10 of the present invention may be of a structure in which a columnar crystal layer is formed on a domain layer having the domains, which is formed on a spherical crystal layer having aggregated spherical crystals, which in turn is formed on the surface of the substrate 12.

As described above, the phosphor layer 14 is made up of the discrete columnar crystals. The conversion panel 10 of the present invention has two or more peaks (at which the profile changes from the upward direction to the downward direction) in the column diameter distribution of the columnar crystals constituting the phosphor layer 14.

Figure 2:
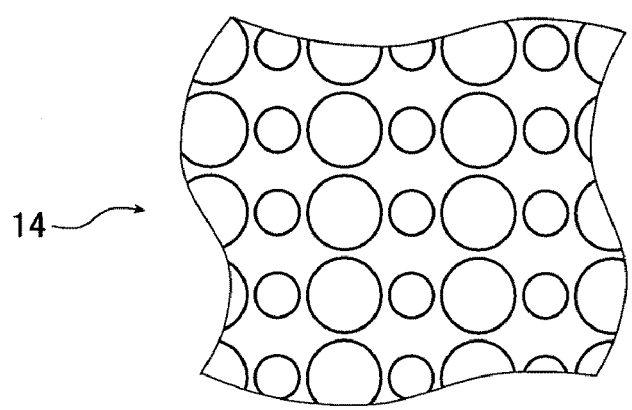
FIG. 2 is a schematic diagram showing the surface of a phosphor layer of the radiation image conversion panel shown in FIG. 1.
Figure 3:
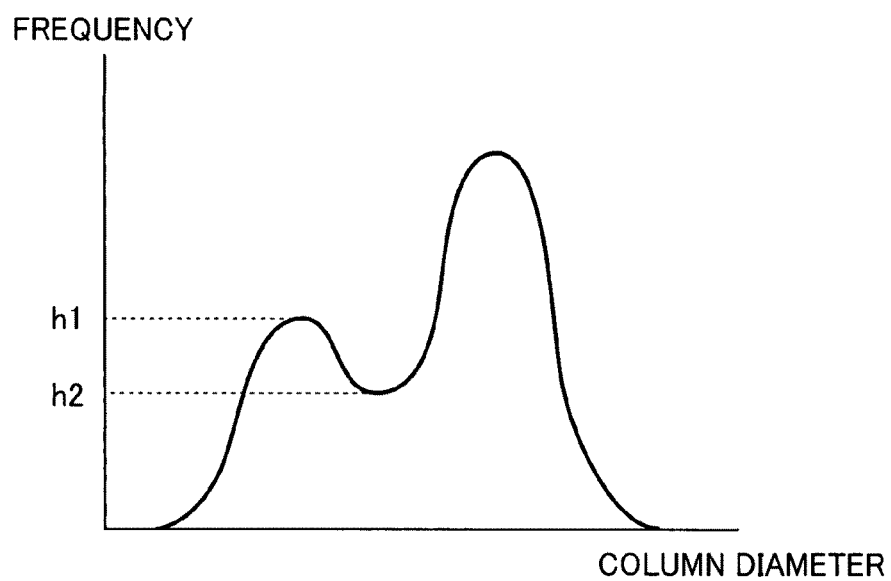
FIG. 3 conceptually shows the column diameter distribution of columnar crystals constituting the phosphor layer of the radiation image conversion panel shown in FIG. 2.

As FIG. 2 schematically shows the surface (the surface opposite from the substrate 12) of the phosphor layer 14, the illustrated conversion panel 10 is basically made up of two types of columnar crystals which are different in diameter, and as FIG. 3 schematically shows, the column diameter distribution has two peaks.

A phosphor layer formed by a vapor-phase deposition technique such as vacuum evaporation and in particular a phosphor layer of a stimulable phosphor have very often a columnar crystal structure made up of columnar crystals.

The column diameter distribution in the phosphor layer of the columnar crystals formed by vapor-phase deposition is a normal distribution and has therefore only one peak. As also described in JP 2003-302498 A, JP 2005-98716 A and EP 1359204 A, in each of the conventional conversion panels, it has been considered that the column diameter of the columnar crystals constituting the phosphor layer is preferably uniform, in other words, the column diameter distribution is preferably as narrow as possible, and therefore the phosphor layer has been produced so that the column diameter distribution is as narrow as possible.

However, the inventor of the present invention has made intensive studies and as a result found that a phosphor layer has higher sensitivity and sharpness (a reproduced image has higher sharpness) in the structure in which the phosphor layer has two or more types of columnar crystals with different diameters, that is, in the state in which the column diameter distribution has two or more peaks than in the structure in which the phosphor layer has columnar crystals with uniform column diameter, that is, in the state in which the column diameter distribution has only one peak.

It is not known why the presence of two or more peaks in the column diameter distribution enhances the sensitivity and sharpness of the conversion panel 10. According to the studies made by the inventor of the present invention, it is presumed that, in such a column diameter distribution, the structure includes two or more types of column crystals with different diameters in such a manner that columnar crystals with smaller diameters are present among columnar crystals with larger diameters, and as a result, the columnar crystals with larger diameters contribute to satisfactory sensitivity and the columnar crystals with smaller diameters embedded among the columnar crystals with larger diameters contribute to satisfactory sharpness.

In the conversion panel 10 of the present invention, it is very difficult to directly measure the column diameters of the columnar crystals constituting the phosphor layer 14. Therefore, in the present invention, the column diameter distribution may be obtained, for example, by taking an electron micrograph of the surface of the produced phosphor layer 14 and measuring the column diameters of the columnar crystals on the electron micrograph.

It is of course preferable to obtain the column diameter distribution through measurement of the column diameters over the entire surface of the phosphor layer 14, but it is not always necessary. The column diameter distribution over the entire surface of the phosphor layer 14 may be properly determined by taking electron micrographs at arbitrary 4 or 5 places with areas of about 1,000 to 100,000 $\mu m^2$ on the surface of the phosphor layer 14 and measuring the column diameters.

There is also no particular limitation on the pitch (step size of the column diameter) in the column diameter distribution. Too large a pitch does not bring about a proper column diameter distribution, whereas too small a pitch may increase an influence of noise or other factor. Therefore, it is preferable to obtain the column diameter distribution at a pitch of 0.1 $\mu m$ and check the number of peaks.

The shape of the columnar crystal (shape seen from the upper surface side (the layer surface side)=shape in the plane parallel to the surface of the substrate 12) is not necessarily a perfect circle. In such a case, another method may be used in which the major axis length and the minor axis length (lengths of the longest and shortest diagonals) are measured and the average of the two measurements is regarded as the column diameter of the columnar crystal (average column diameter= (major axis length+minor axis length)/2).

In the conversion panel 10 of the present invention, there is no particular limitation on the column diameter (average column diameter) of the columnar crystal in the phosphor layer 14, and the column diameter is preferably in the range of 3 to 15 $\mu m$.

The present invention preferably satisfies Expression:

$$0.4R \leq r \leq 0.8R (0.4 \leq r/R \leq 0.8)$$

wherein R is the column diameter at the largest column diameter peak and r is the column diameter at another peak in the column diameter distribution of the columnar crystals.

Such a structure can give preferable results, for example, in terms of keeping the columnar crystals discrete (maintaining the spaces among the columnar crystals) while achieving high PSL sensitivity through close packing of crystals.

There is also no particular limitation on the coefficient of variation in the column diameter distribution of the columnar crystals of the phosphor layer 14 and the coefficient of variation is preferably between 0.05 and 0.3, with the range of 0.05 to 0.2 being particularly preferred.

Such a structure can give preferable results, for example, in terms of keeping the columnar crystals discrete (maintaining the spaces among the columnar crystals) while achieving high PSL sensitivity through close packing of crystals.

In the conversion panel 10 of the present invention, there is no particular limitation on the number of peaks in the column diameter distribution, as long as the number of peaks is at least 2.

However, when the number of peaks is too large, the conversion panel 10 functions in the same manner as a common conversion panel in which the column diameter distribution has only one peak, and may not fully achieve the effects of the present invention. A drawback such as difficulty in controlling the crystal packing with the columnar crystals kept discrete (spaces among the columnar crystals maintained) may arise, so the number of peaks is preferably up to 15 and particularly 2 to 5.

In the present invention, with respect to a valley between two peaks (at which the profile changes from the downward direction to the upward direction) and the two peaks between which the valley is sandwiched, it is preferable to have at least one peak satisfying the condition that the height (frequency) of the valley is up to 99% of the height of the lower peak (i.e., the relation between such valley and the two peaks between which the valley is sandwiched is found in one or more places). To be more specific, now referring to FIG. 3 showing a valley and two peaks between which the valley is sandwiched, the height h2 of the valley is preferably up to 99% of the height h1 of the lower peak. In other words, the conversion panel 10 of the present invention preferably has two or more peaks each adjacent to a valley whose height is up to 99% of the height of the peak in the column diameter distribution of the phosphor layer 14.

Such a structure consistently ensures the effect of the present invention that satisfactory sensitivity and sharpness are obtained by the column diameter distribution with two or more peaks, and is therefore preferable.

The columnar crystals constituting the phosphor layer 14 may be of any shape without any particular limitation, but a shape close to a perfect circle is preferable, and a shape of a polygon such as the one having four or more sides is more preferable, and a shape of a polygon such as the one having five or more sides is even more preferable.

In addition, the average of the ratio (aspect ratio) AR of the major axis length to the minor axis length (major axis length/minor axis length=AR) in the columnar crystals constituting the phosphor layer 14 preferably satisfies Expression "1<AR<2" and more preferably "1<AR<1.5".

When the ratio AR of the major axis length to the minor axis length in the columnar crystals constituting the phosphor layer 14 takes a larger value, the packing fraction of the phosphor in the phosphor layer 14 may not be sufficient to obtain satisfactory adhesion strength between the substrate 12 and the phosphor layer 14.

On the contrary, when the ratio AR of the major axis length to the minor axis length takes a smaller value, the packing fraction and as a result, the X-ray absorption capacity are increased to enable a high-quality radiation image to be obtained. In addition, a higher packing fraction facilitates stress relaxation in every direction to increase the adhesion strength between the substrate 12 and the phosphor layer 14.

In particular, if at least 30% of the columnar crystals have a shape of a pentagon or a polygon having six or more sides when the phosphor layer 14 is seen from its surface side, a high-quality radiation image can be obtained while achieving sufficient adhesion strength between the substrate 12 and the phosphor layer 14.

The phosphor layer 14 made up of the columnar crystals which preferably have a shape of a pentagon or a polygon with six or more sides and also satisfy the average of the ratio AR between the major axis length and minor axis length can be formed by the following process: The surface of the substrate 12 on which the phosphor layer 14 is to be formed is fully cleaned and is also subjected to plasma cleaning to be rendered sufficiently hydrophilic; and the phosphor layer 14 is formed while controlling the temperature of the substrate 12, that is, the temperature of the phosphor layer 14 or controlling the temperature at the time of vapor deposition for the phosphor layer 14 during its formation (film deposition). Exemplary methods that may be used to obtain columns with polygonal sections include a method in which projections and recesses are formed in the surface of the substrate 12 in a polygonal pattern and a method in which the substrate 12 is controlled to have a temperature of at least 100° C. while the degree of vacuum at the time of vapor deposition is controlled in the range of 0.1 to 3 Pa.

The conversion panel 10 of the present invention has no particular limitation on the thickness of the phosphor layer 14 and it is preferably between 100 μm and 1500 μm, with the range of 500-1000 μm being particularly preferred.

Adjusting the thickness of the phosphor layer 14 to lie within those ranges is preferred from various viewpoints including the image sharpness.

In the case where the phosphor layer 14 in the conversion panel 10 of the present invention is made up of a stimulable phosphor including a phosphor and an activator, the stimulable phosphor may be used to form the whole of the phosphor layer 14. However, it is preferable to form in its lower part a matrix region that contains substantially no activator and form thereon a region of a stimulable phosphor containing an activator. For example, in the case where the stimulable phosphor is CsBr:Eu that contains Eu as an activator, the matrix region is substantially formed of only CsBr, whereas the stimulable phosphor region is formed of CsBr:Eu. The expression "contains substantially no activator" means that the content of an activator is up to $1.0 \times 10^{-6}$ ppm and preferably no activator is completely contained.

The matrix region acts as the stress relaxing layer, so the abovementioned structure enables the adhesion between the phosphor layer 14 and the substrate 12 to be more enhanced.

In the present invention, there is no particular limitation on the phosphor used to form the phosphor layer 14, but various known phosphors as used in radiation image conversion panels may be used.

In terms of readily achieving the effects of the present invention, stimulable phosphors containing a phosphor and an activator are advantageous, with alkali halide-based stimulable phosphors represented by the general formula "$M^{I}X \cdot aM^{II}X'_2 \cdot bM^{III}X''_3 : cA$" as disclosed in JP 61-72087 A being more advantageously used. In this formula, $M^{I}$ represents at least one element selected from the group consisting of Li, Na, K, Rb, and Cs. $M^{II}$ represents at least one divalent metal selected from the group consisting of Be, Mg, Ca, Sr, Ba, Zn, Cd, Cu, and Ni. $M^{III}$ represents at least one trivalent metal selected from the group consisting of Sc, Y, La, Ce, Pr, Nd, Pm, Sm, Eu, Gd, Tb, Dy, Ho, Er, Tm, Yb, Lu, Al, Ga, and In. X, X', and X" each represent at least one element selected from the group consisting of F, Cl, Br, and I. A represents at least one element selected from the group consisting of Eu, Tb, Ce, Tm, Dy, Pr, Ho, Nd, Yb, Er, Gd, Lu, Sm, Y, Tl, Na, Ag, Cu, Bi, and Mg, $0 \leq a < 0.5$, $0 \leq b < 0.5$, and $0 < c \leq 0.2$.

Of these, an alkali halide-based stimulable phosphor in which $M^I$ contains at least Cs, X contains at least Br, and A is Eu or Bi is preferred, and a stimulable phosphor represented by the general formula "CsBr:Eu" is more preferred because they have excellent photostimulated luminescence characteristics and the effects of the present invention are advantageously achieved.

Various other stimulable phosphors disclosed in, for example, U.S. Pat. No. 3,859,527, JP 55-12142 A, JP 55-12144 A, JP 55-12145 A, JP 56-116777 A, JP 58-69281 A, JP 58-206678 A, and JP 59-38278 A and JP 59-75200 A may also be advantageously used.

The conversion panel 10 having the phosphor layer of a stimulable phosphor is not the sole case of the present invention, but the present invention may be advantageously used in various radiation image conversion panels having a phosphor layer including columnar phosphor crystals, such as a radiation scintillator panel having a phosphor layer including columnar crystals of a phosphor such as cesium iodide.

In the conversion panel 10 of the present invention, the phosphor layer 14 is formed by various vapor-phase deposition techniques (vacuum film deposition techniques) including vacuum evaporation, sputtering, and CVD (chemical vapor deposition).

Among these techniques, vacuum evaporation is a preferred method for forming the phosphor layer 14 from various viewpoints such as productivity.

In the case of using a stimulable phosphor, it is preferred to form the phosphor layer 14 by two-source (multi-source) vacuum evaporation in which two film-forming materials, one for the phosphor and the other for the activator, are independently heated to evaporate.

In the case of using CsBr:Eu as the stimulable phosphor, it is preferred to perform two-source vacuum evaporation which uses cesium bromide (CsBr) as the film-forming material for the phosphor and europium bromide ($EuBr_x$; x is usually from 2 to 3, with 2 being preferred) as the film-forming material for the activator, respectively.

When the phosphor layer 14 is formed by vacuum evaporation, there is no particular limitation on the heating method that can be employed in vacuum evaporation and the phosphor layer may be formed by electron beam heating using an electron gun or the like, or by resistance heating. If the phosphor layer is to be formed by multi-source vacuum evaporation, all film-forming materials may be heated to evaporate by the same heating means (such as electron beam heating). Alternatively, the film-forming material for the phosphor may be heated to evaporate by electron beam heating while the film-forming material for the activator, which is present in a very small amount, may be heated to evaporate by resistance heating.

There is also no particular limitation on the conditions (of film deposition) under which the phosphor layer 14 is to be formed and they may be determined as appropriate for the type of the vapor-phase deposition method used, the film-forming materials used, the heating means, and other factors.

The conversion panel 10 of the present invention is further described below. If the phosphor layer 14 including any one of the aforementioned various stimulable phosphors, particularly an alkali halide-based stimulable phosphor, more particularly a stimulable phosphor represented by the general formula "CsX:Eu", and most particularly "CsBr:Eu" is to be formed by vacuum evaporation, a preferred procedure comprises first evacuating the system to a high degree of vacuum, then introducing an argon gas, a nitrogen gas or the like into the system to achieve a degree of vacuum between about 0.01 Pa and 3 Pa (which is hereinafter referred to as "medium degree of vacuum" for the sake of convenience), and heating the film-forming materials by resistance heating or the like to perform vacuum evaporation under such medium degree of vacuum.

As already mentioned, the phosphor layer 14 in the conversion panel 10 of the present invention has discrete columnar crystals formed therein. The phosphor layer 14 that is formed by performing film deposition under the medium degree of vacuum, in particular, the phosphor layer 14 of an alkali halide-based stimulable phosphor such as CsBr:Eu has an especially satisfactory columnar crystal structure and is preferred in such terms as the PSL characteristics and the sharpness of the image that can be produced.

The phosphor layer 14 as described above that has the columnar crystals of which the column diameter distribution has two or more peaks can be consistently produced by the production process of the present invention in which the substrate 12 which has an uneven surface including two or more types of columnar projections different in diameter and which satisfies Expression "$0.4R \leq r \leq 0.8R$" wherein R is the diameter of the largest projection and r is the diameter of another projection, is used to form the phosphor layer on its surface by a vapor-phase deposition technique such as vacuum evaporation.

In terms of further ensuring formation (by deposition) of the phosphor layer 14 having columnar crystals whose column diameter distribution has two or more peaks, and advantageously achieving the effects of the present invention by forming the phosphor layer 14 in such a manner that the column diameter distribution has two or more peaks, the projections of the substrate 12 are preferably formed in a state in which projections with diameters corresponding to the desired column diameter distribution are patterned, and the projections are more preferably formed in such a manner that the projections with different diameters are disposed in a predetermined array at predetermined intervals (at a predetermined pitch).

As described above, the number of peaks in the column diameter distribution of the phosphor layer 14 is preferably up to 15. Therefore, preferably up to 15 types and more preferably 2 to 5 types of projections which are different in diameter are formed on the substrate 12.

A technique is known in which a substrate having a large number of projections is used to advantageously produce discrete columnar crystals, thus forming a phosphor layer thereon by vapor-phase deposition. In such a process for forming the phosphor layer, in general, crystals preferentially grow from the projections and as a result, the columnar crystals can be advantageously formed in a discrete manner.

For example, commonly assigned JP 2004-3955 A discloses the conversion panel that has very high sharpness and which has a phosphor layer formed on a substrate (support) having a large number of projections on its surface, with the phosphor layer being only formed of columnar crystals which have grown from the projections as the starting points and which have definite boundaries and are optically independent of each other.

The column diameter of the columnar crystal having grown from the projection basically depends on the diameter of the projection. If the phosphor layer is formed under the same conditions, there is hardly a case where a columnar crystal having grown from a projection with a smaller diameter has a larger diameter than that of a columnar crystal having grown from a projection with a larger diameter.

Therefore, the phosphor layer 14 in which the column diameter distribution has at least two peaks can be advantageously produced by using the substrate 12 with an uneven surface in which two or more types of projections with different diameters are formed in a pattern according to the desired column diameter distribution. A balance can also be suitably struck between columnar crystals with larger diameters and columnar crystals with smaller diameters if Expression "$0.4R \leq r \leq 0.8R$" wherein R is the diameter of the largest projection and r is the diameter of another projection is satisfied.

In the present invention, there is no particular limitation on the projection diameter, and the diameter is determined as appropriate within a range in which the column diameter of a columnar crystal growing from a projection depends on the diameter of the projection, because the diameter of a columnar crystal growing from a projection whose diameter is too large does not depend on the diameter of the projection but a plurality of narrow columnar crystals are formed on the projection.

The phosphor layer 14 in which the column diameter distribution has two or more peaks can also be produced in the same manner by using a substrate formed by patterning projections of different sizes (different upper surface sizes) which are not cylindrical but prismatic and are preferably in the shape of a quadrangular prism or a prism whose cross section has five or more sides.

In this case, the projection diameters R and r may be determined from the diagonal length (average of the largest length and the smallest length in the case where its cross section is not in the shape of a regular polygon).

When a substrate on which not projections of different column diameters (sizes) but projections of an identical column diameter are formed and hence which has an uneven surface is used to form the phosphor layer, the projection diameter, projection pitch (center-to-center distance), spacing between adjacent projections, projection height, and ratio between the projection diameter and the pitch may be mutually adjusted to produce the phosphor layer 14 in which the column diameter distribution has two or more peaks.

In the case where the phosphor layer 14 in which the column diameter distribution has two or more peaks is thus produced by adjusting the size, pitch, and height of the projections and other factors, the projection height is extremely important and need be set to 0.8 μm or less.

As described above, the projections formed on the surface of the substrate 12 enable the columnar crystals to grow from the projections serving as starting points. The larger the height of the projection is, the more highly the projection is selected for the growth of the columnar crystal. If a projection formed on the surface of the substrate 12 has a height exceeding 0.8 μm and particularly a height of 1 μm or more, a crystal only grows from this projection. As a result, as shown in JP 2004-3955A, columnar crystals of the same column diameter are densely formed on the projections serving as the starting points.

On the other hand, if a projection has a height of up to 0.8 μm, the selectivity of the projection for the growth of a columnar crystal is reduced so that the columnar crystal may grow not from the projection but from the substrate surface (recess). However, projections are highly selected for the growth of columnar crystals, so the columnar crystals preferentially grow from the projections. Therefore, a columnar crystal growing from a projection serving as the starting point has a larger column diameter than that of another columnar crystal growing from the substrate surface except the projections. As a result, it is possible to produce the phosphor layer 14 in which the columnar crystals having grown from the projections and the columnar crystals having grown from the substrate surface except the projections are different in column diameter, and the column diameter distribution has two or more peaks.

However, a substrate with too low projections functions in the same manner as a substrate having no projection, so the projection height need be set to at least 0.1 μm.

Various known processing techniques may be used without any particular limitation for the method of forming such projections (projections and recesses) on the substrate 12.

For example, a method may be suitably used in which a photolithographic technique as used in semiconductor manufacture is used to form a pattern corresponding to projections to be formed with a photoresist, and etching is carried out while the photoresist is masked, thereby forming a desired pattern of projections (projections and recesses) on the substrate 12.

Alternatively, a method in which the surface of the substrate 12 is sandblasted to form a pattern of projections and recesses may be used.

A method of forming the phosphor layer 14 by providing the temperature distribution to the substrate 12 may also be used for forming the phosphor layer 14 in which the column diameter distribution of the columnar crystals have two or more peaks.

In general, a columnar crystal of a larger diameter grows at a higher substrate temperature. Therefore, the phosphor layer 14 in which the column diameter distribution of the columnar crystals has two or more peaks can be obtained, for example, by forming it in a state in which the substrate has point-like high-temperature portions and/or low-temperature portions.

Various methods may be used for providing the temperature distribution to the substrate 12, and as an exemplary method, a substrate holder of a phosphor layer-forming apparatus (e.g., vacuum evaporation apparatus) is provided with a temperature adjusting means which is brought into contact with the back surface of a substrate to heat it or radiate the heat thereof, and the back surface of the substrate or the holder surface with which the substrate comes in contact is made uneven so that the substrate is brought into point contact with the holder to make the substrate 12 have a temperature distribution.

The phosphor layer 14 formed on the substrate 12 in this manner is then annealed (subjected to thermal treatment) if necessary.

Prior to forming the phosphor layer 14 on the substrate 12, the surface of the substrate 12 is preferably cleaned by plasma cleaning or the like.

In its preferred embodiment, the illustrated conversion panel 10 has the protective layer 20 that covers the entire surface of the phosphor layer 14 to hermetically seal it.

The phosphor layer formed by vapor-phase deposition, and particularly the phosphor layer of the alkali halide-based stimulable phosphor are highly hygroscopic and will readily deteriorate upon absorption of moisture.

Therefore, in order to prevent the moisture absorption of the phosphor layer, it is preferable that, as shown in FIG. 1, the conversion panel 10 of the present invention be provided with the protective layer 20 that has moisture resistance (water impermeability) and entirely covers the phosphor layer 14 to hermetically seal it.

Various types of material may be used for the protective layer 20 without any particular limitation as long as the material has sufficient moisture resistance.

For example, the protective layer 20 is formed of 3 sub-layers on a polyethylene terephthalate (PET) film: an $SiO_2$ film; a hybrid sub-layer of $SiO_2$ and polyvinyl alcohol (PVA); and an $SiO_2$ film. For formation of the protective layer 20 having 3 sub-layers of $SiO_2$ film/hybrid sub-layer of $SiO_2$ and PVA/$SiO_2$ film on the PET film, the $SiO_2$ films may be formed through sputtering and the hybrid sub-layer of $SiO_2$ and PVA may be formed through a sol-gel process, for example. The hybrid sub-layer is preferably formed to have a ratio of PVA to $SiO_2$ of 1:1.

Other examples of the material that may be preferably used for the protective layer 20 include a glass plate (film); a film of resin such as polyethylene terephthalate or polycarbonate; and a film having an inorganic substance such as $SiO_2$, $Al_2O_3$, or SiC deposited on the resin film.

To construct the conversion panel 10 of the present invention, the phosphor layer 14 is entirely covered with the protective layer 20 that surrounds the entire circumference of the phosphor layer 14 and the adhesive layer 18 is applied to adhere the protective layer 20 to the substrate 12, whereby the protective layer 20 entirely covers the phosphor layer 14 to hermetically seal it.

Figure 4:
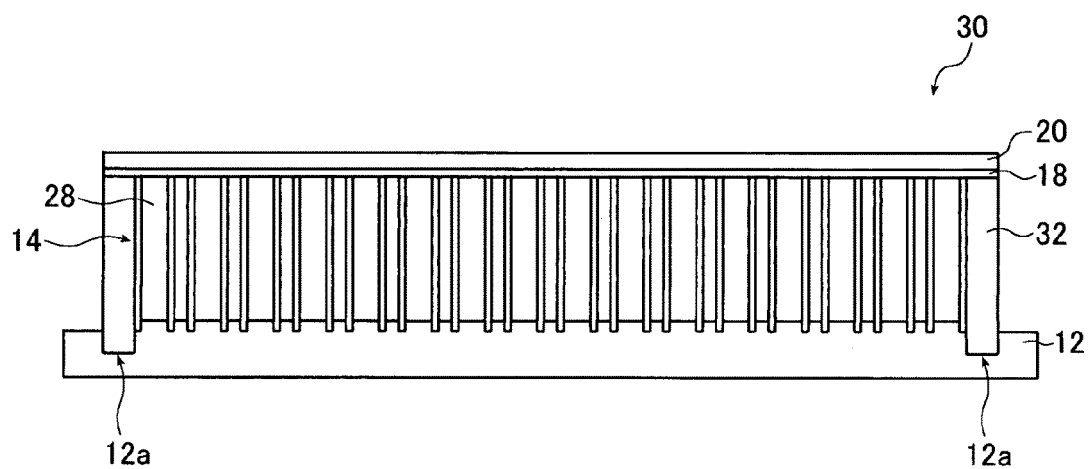
FIG. 4 is a schematic diagram showing another embodiment of the radiation image conversion panel of the present invention.

However, in a more preferred embodiment, the adhesive layer 18 is applied not only between the substrate 12 and the protective layer 20 but also to the surface of a columnar crystal layer 28 as shown in FIG. 4, so that the protective layer 20 is also adhered to the columnar crystal layer 28. This structural design helps prevent such problems as the floating of the protective layer 20, thus providing a highly durable conversion panel 10 that features even better mechanical strength.

The adhesive layer 18 for the protective layer 20 is not limited in any particular way and various types may be employed as long as they have sufficient adhesive power. However, if the adhesive layer 18 is to be additionally provided on the surface of the columnar crystal layer 28 as shown in FIG. 4, it must have such optical characteristics as to permit sufficient transmission of photostimulated luminescence and exciting light.

Figure 5:
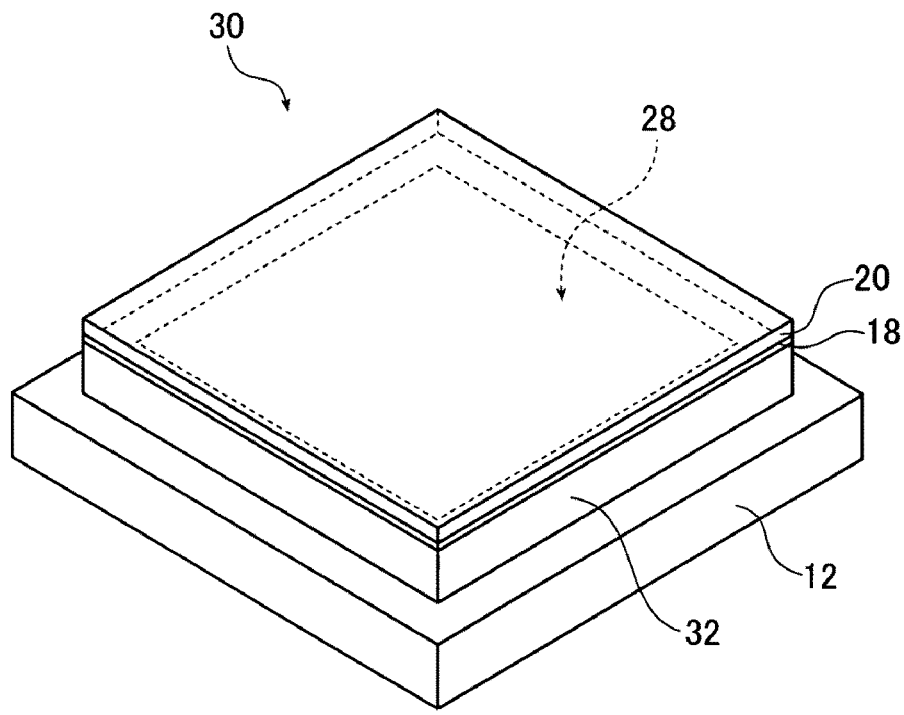
FIG. 5 is a perspective diagram conceptually showing the radiation image conversion panel shown in FIG. 4.

Another preferred embodiment of the present invention is schematically shown in FIGS. 4 and 5. A (radiation image) conversion panel 30 in those Figures has a frame member 32 (such as a square or rectangular frame) that surrounds the phosphor layer 14 in a direction parallel to the plane of the phosphor layer 14 (the substrate 12), and the protective layer 20 is adhered to the frame member 32 (and optionally the phosphor layer 14) such that the phosphor layer 14 is entirely sealed hermetically.

To produce this conversion panel 30, the frame member 32 is first fixed to the substrate 12. In the preferred embodiment shown in FIG. 4, a groove 12a is formed in the surface of the substrate 12 and the frame member 32 is inserted into the groove 12a so that it is fixed to the substrate 12. This structural design is preferable since it not only improves the precision in the position of the frame member 32 but also provides greater ease in its positioning and other operations.

Of course, the present invention is by no means limited to this embodiment and the frame member 32 may be fixed to the substrate 12 without providing the groove 12a. The frame member 32 may also be fixed by various other methods depending on the materials and shapes of the substrate 12 and the frame member 32 and they include the use of an adhesive, the use of a solder, and the fitting into the groove 12a if it is formed in the surface of the substrate 12.

In the next step, with a mask applied, a suitable vapor-phase deposition technique such as vacuum evaporation is used to form the phosphor layer 14 as described above within the region surrounded by the frame member 32.

When the formation of the phosphor layer 14 ends, annealing is optionally performed; the adhesive layer 18 is then formed on top of the frame member 32; both the frame member 32 and the phosphor layer 14 are covered with the protective layer 20, which is adhered to the frame member 32 by heat lamination or the like to entirely cover and hermetically seal the phosphor layer 14 with the frame member 32 and the protective layer 20 to thereby produce the conversion panel 30. Here again, the adhesive layer 18 may only be applied to the upper surface of the frame member 32 to adhere the frame member 32 to the protective layer 20, but as shown in FIG. 4, the adhesive layer 18 is preferably provided on the surface of the phosphor layer 14, too, so that the latter is adhered to the protective layer 20 by means of the adhesive layer 18. This is the same case as the embodiment shown in FIG. 1.

By providing the frame member 32 and adhering the protective layer 20 to the member 32, the surface of the phosphor layer 14 and the adhering surface of the protective layer 20 as the latter seals the phosphor layer 14 can be made generally flush with each other and, hence, sealing by the protective layer 20 can be accomplished more easily and without damaging the phosphor layer 14.

While the radiation image conversion panel and the process for producing the radiation image conversion panel according to the present invention have been described above in detail, the present invention is by no means limited to the foregoing embodiments and it should be understood that various improvements and modifications can of course be made without departing from the scope and spirit of the invention.

EXAMPLES

On the following pages, the present invention is described in greater detail with reference to specific examples. It should of course be understood that the present invention is by no means limited to the following examples.

Example 1

Using europium bromide and cesium bromide as film-forming materials for the activator and the phosphor, respectively, two-source vacuum evaporation was carried out to prepare a conversion panel of the type shown in FIG. 1 which is generally indicated by 10 and has a phosphor layer 14.

An aluminum plate having an area of 450×450 mm (thickness: 10 mm) was prepared.

Figure 6A:
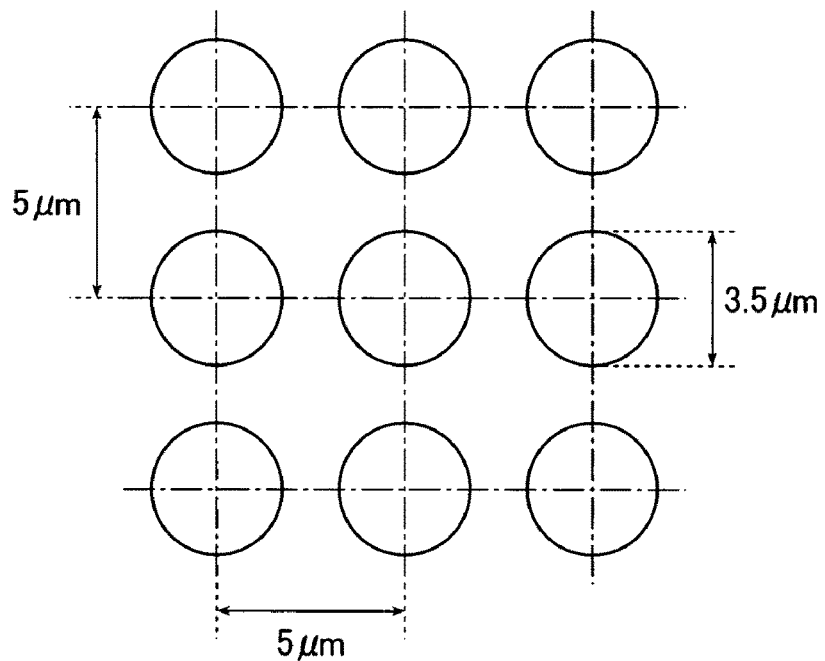
FIGS. 6A and 6B are diagrams for illustrating substrates used in the Examples of the present invention.

Over the whole surface of the aluminum plate (surface on which the phosphor layer is to be formed) were formed columnar projections, which had each a column diameter of 3.5 μm and a height of 0.5 μm and were centered on the points of intersection in a grid pattern with squares each having a side length of 5 μm (see FIG. 6A), thus obtaining the substrate 12. The projections (projections and recesses) were formed by photolithography.

The substrate 12 was set on a substrate holder in a vacuum evaporation apparatus; in addition, the respective film-forming materials were set in specified positions and the surface of the substrate 12 was masked such that films would be deposited in the center area of the substrate 12 measuring 430×430 mm. The substrate holder was equipped with a heater that heats the substrate from its back surface (surface on which the phosphor layer was not to be formed).

The film-forming materials were heated in a resistance heating apparatus using tantalum crucibles and a DC source capable of outputting a power of 6 kW. Installed above the crucibles was a shutter for shielding against the film-forming materials having evaporated therefrom. The crucible accommodating the film-forming material for the phosphor was furnished with a temperature measuring means.

After setting the substrate on its holder, the vacuum chamber was closed and switched on to perform evacuation using a diffusion pump and a cryogenic coil. The shutter was in the closed state.

When the degree of vacuum had reached $8 \times 10^{-4}$ Pa, argon gas was introduced into the vacuum chamber to adjust the degree of vacuum to 2.6 Pa; then, the DC source was driven so that an electric current was applied to the crucibles to melt the film-forming materials they contained. Cesium bromide was melted at 670° C. As for europium bromide, the power was raised until its melting temperature was reached and a complete melt of europium bromide was formed; thereafter, the power input was reduced until the temperature was not high enough for the europium bromide to evaporate. The power to be delivered for melting the europium bromide was controlled in accordance with a preliminary experiment for its melting.

At the point in time when 60 minutes had passed since the start of melting the film-forming materials, the shutter above the crucibles loaded with cesium bromide was opened so that the formation of the phosphor layer 14 (matrix region) on the surface of the substrate 12 by vapor deposition started (cesium bromide was vaporized at the temperature of 670° C.).

As soon as the shutter was opened, the substrate 12 was heated to 160° C. with the heater. The power to be applied to the crucibles was adjusted such that the deposition rate of cesium bromide onto the substrate 12 could reach 6 µm/min.

When the layer thickness reached 50 µm, the shutter was closed and the supply of argon gas was so adjusted that the pressure (Ar gas pressure) in the vacuum chamber would be 0.8 Pa; at the same time, the power to europium bromide (or its crucibles) was raised to the level at which the molarity ratio of Eu/Cs in the phosphor layer checked in advance would be 0.001:1.

The shutter above the crucibles loaded with cesium bromide and europium bromide was opened to resume the formation of the phosphor layer 14 (start the vapor deposition of the stimulable phosphor).

When the thickness of the phosphor layer 14 reached 700 µm, the DC source was switched off to stop the application of an electric current to the crucibles to end the formation of the phosphor layer 14.

Subsequently, dry air was introduced into the vacuum chamber until the internal pressure became atmospheric and the phosphor layer was left to cool in the chamber as it was open to the atmosphere. After the end of the cooling, the substrate 12 (conversion panel 10) was detached from its holder and taken out of the vacuum chamber. The substrate 12 was annealed at 200° C. for 2 hours to prepare the conversion panel.

Figure 7:
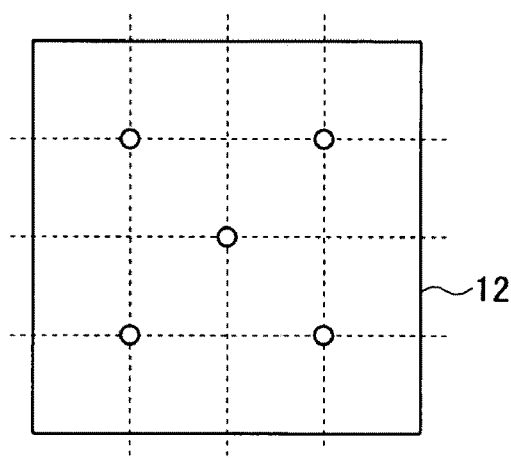
FIG. 7 is a diagram for illustrating a method of measuring the column diameter distribution in the Examples of the present invention.

As schematically shown in FIG. 7, the substrate 12 (region where the phosphor layer was formed) in the resulting conversion panel was horizontally and vertically divided into quarters, respectively, and images with an area of 50×60 µm were taken at 4 points of intersection near the corners of the substrate and at a point of intersection in the center of the substrate 12 to obtain electron micrographs. In each of the thus obtained five micrographs, the column diameter (average of the major axis length and the minor axis length) of the columnar crystals was measured, thus obtaining a column diameter distribution. The column diameter distribution was prepared at a pitch (step size) of 0.1 µm, and indicated by the frequency relative to the highest peak taken as 1.

Figure 8A:
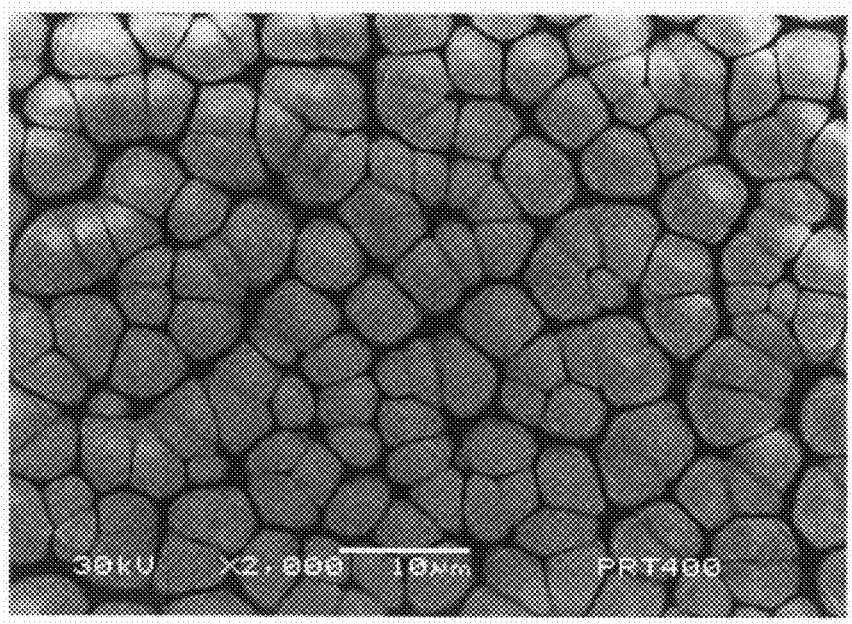
FIG. 8A shows a print image obtained by outputting image data in a micrograph of a phosphor layer in the Examples of the present invention.
Figure 8B:
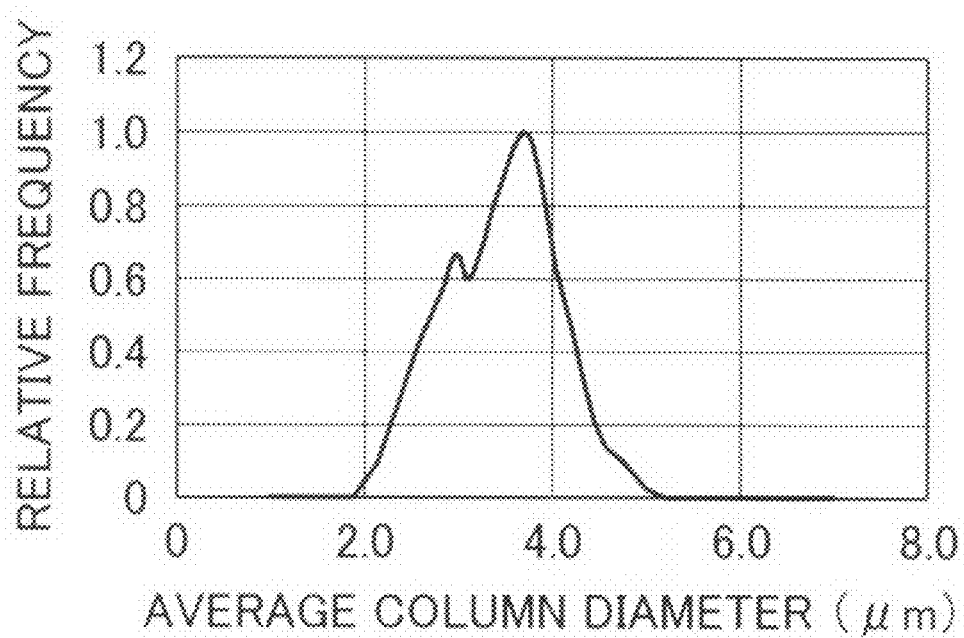
FIG. 8B shows the column diameter distribution of columnar crystals constituting the phosphor layer shown in FIG. 8A.

One of the electron micrographs of the conversion panel (print image obtained by outputting the image data of the micrograph) and its column diameter distribution are shown in FIGS. 8A and 8B, respectively. As shown in FIG. 8B, the column diameter distribution of the columnar crystals constituting the phosphor layer of the conversion panel has two peaks. The column diameter R at the largest peak in the diameter distribution of the columnar crystals is 3.7 µm and the column diameter r at the other peak in the diameter distribution of the columnar crystals is 2.96 µm, so r/R is 0.8 and is within the preferred range of the present invention.

Example 2

A conversion panel was prepared by repeating the procedure of Example 1 except that the projections having a height of 0.8 µm were formed on the substrate 12.

Figure 9A:
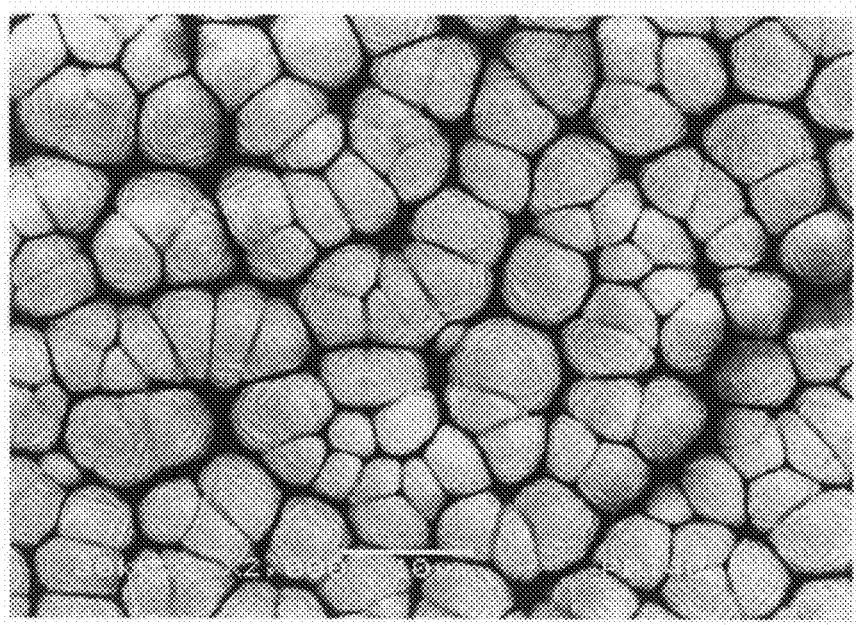
FIG. 9A shows a print image obtained by outputting image data in a micrograph of another phosphor layer in the Examples of the present invention.
Figure 9B:
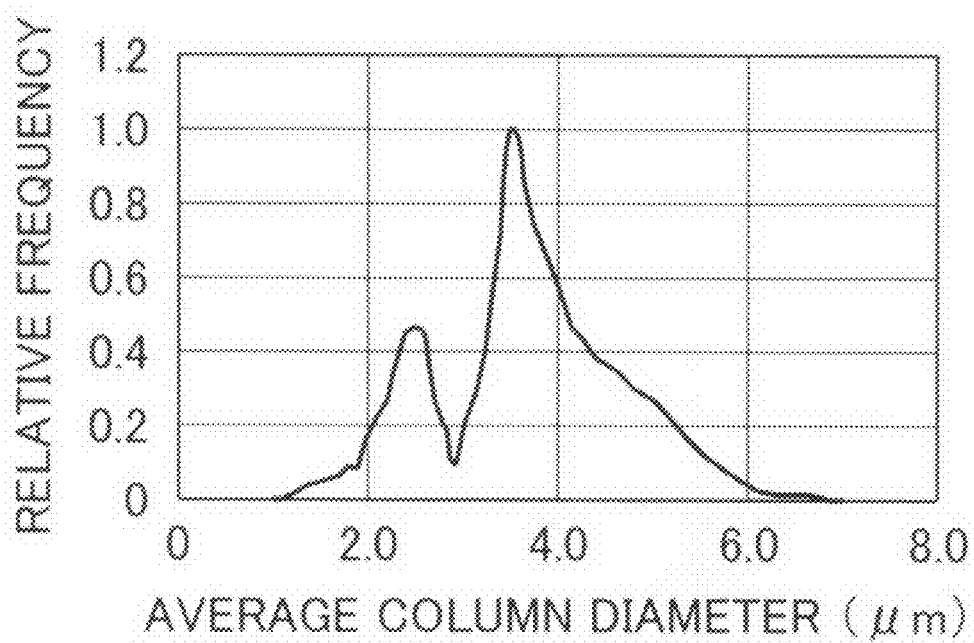
FIG. 9B shows the column diameter distribution of columnar crystals constituting the phosphor layer shown in FIG. 9A.

The column diameter distribution of the prepared conversion panel was obtained in the same manner as in Example 1. One of the electron micrographs of the conversion panel and its column diameter distribution are shown in FIGS. 9A and 9B, respectively. As shown in FIG. 9B, the column diameter distribution of the columnar crystals constituting the phosphor layer of the conversion panel has two peaks. The column diameter R at the largest peak in the diameter distribution of the columnar crystals is 3.48 µm and the column diameter r at the other peak in the diameter distribution of the columnar crystals is 2.48 µm, so r/R is 0.71 and is within the preferred range of the present invention.

Example 3

Figure 6B:
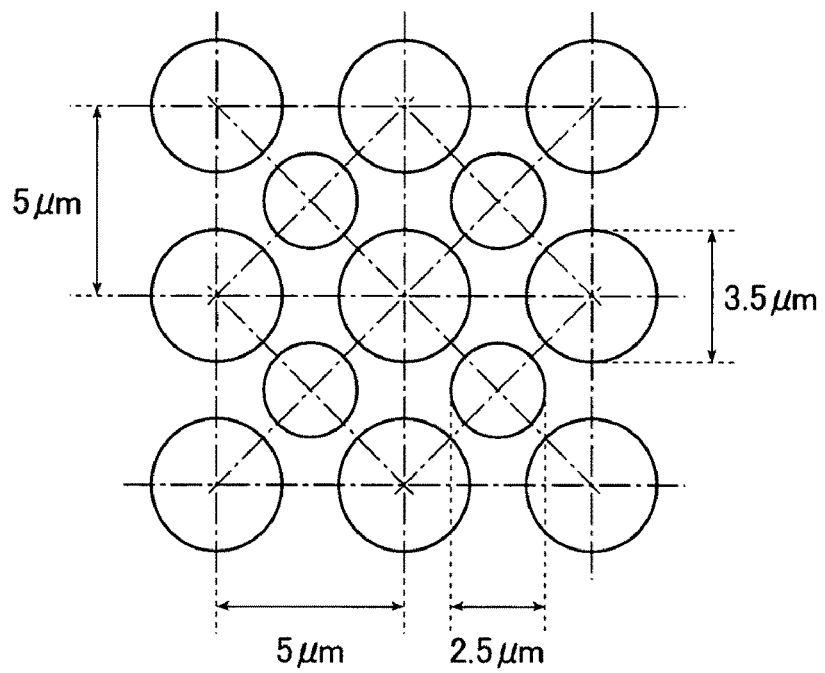

On the same aluminum plate as used in Example 1, were formed columnar projections which had each a column diameter (diameter) of 3.5 µm and a height of 1 µm and were centered on the points of intersection in a grid pattern with squares each having a side length of 5 µm, and columnar projections which had each a column diameter of 2.5 µm and a height of 1 µm and were centered on the centers of the squares (see FIG. 6B). The column diameter R at the largest peak in the diameter distribution of the columnar projections is 3.5 µm and the column diameter r at the other peak in the diameter distribution of the columnar projections is 2.5 µm, so r/R is 0.71 and is within the preferred range of the present invention.

The projections were formed in the same manner as in Example 1.

A conversion panel was prepared by repeating the procedure of Example 1 except that the substrate 12 having two types of projections with different column diameters formed thereon was used.

Figure 10A:
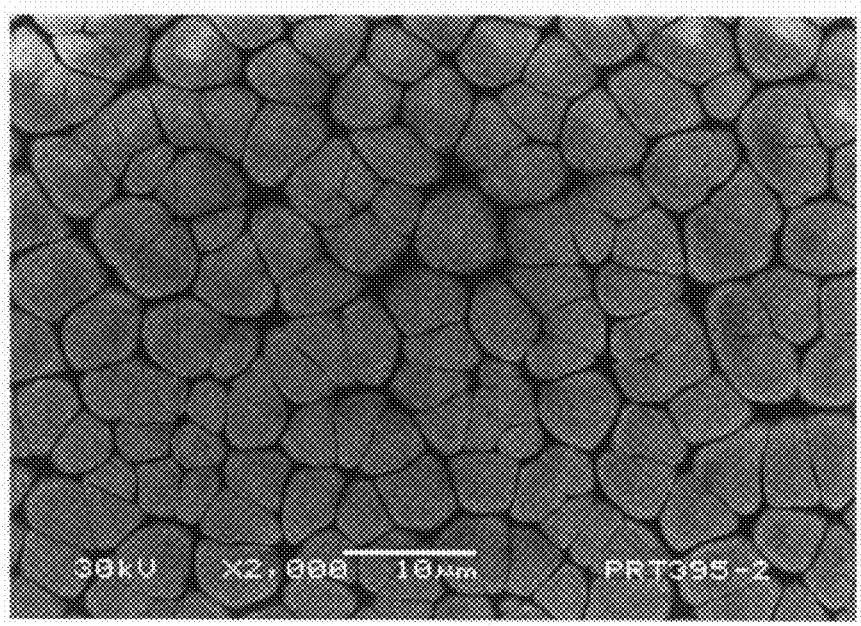
FIG. 10A shows a print image obtained by outputting image data in a micrograph of still another phosphor layer in the Examples of the present invention.
Figure 10B:
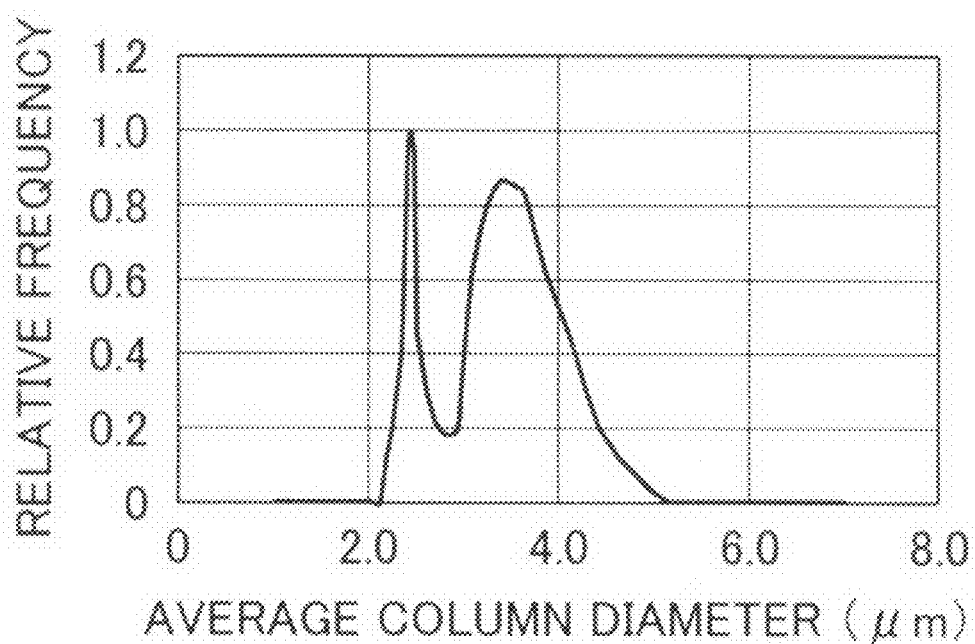
FIG. 10B shows the column diameter distribution of columnar crystals constituting the phosphor layer shown in FIG. 10A.

The column diameter distribution of the prepared conversion panel was obtained in the same manner as in Example 1. One of the electron micrographs of the conversion panel and its column diameter distribution are shown in FIGS. 10A and 10B, respectively. As shown in FIG. 10B, the column diameter distribution of the columnar crystals constituting the phosphor layer of the conversion panel has two peaks. The column diameter R at the largest peak in the diameter distribution of the columnar crystals is 3.33 µm and the column diameter r at the other peak in the diameter distribution of the columnar crystals is 2.44 µm, so r/R is 0.73 and is within the preferred range of the present invention.

Comparative Example 1

A conversion panel was prepared by repeating the procedure of Example 1 except that an aluminum plate with an area of 450×450 mm as used in Example 1 was used for the substrate without further processing (no projection was formed on the substrate surface).

Figure 11A:
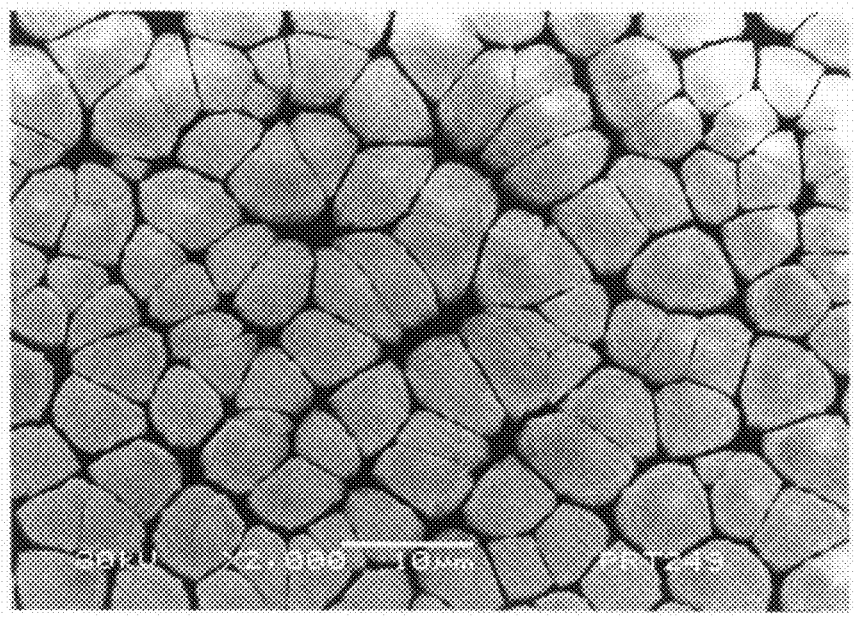
FIG. 11A shows a print image obtained by outputting image data in a micrograph of a phosphor layer in the Comparative Examples of the present invention.
Figure 11B:
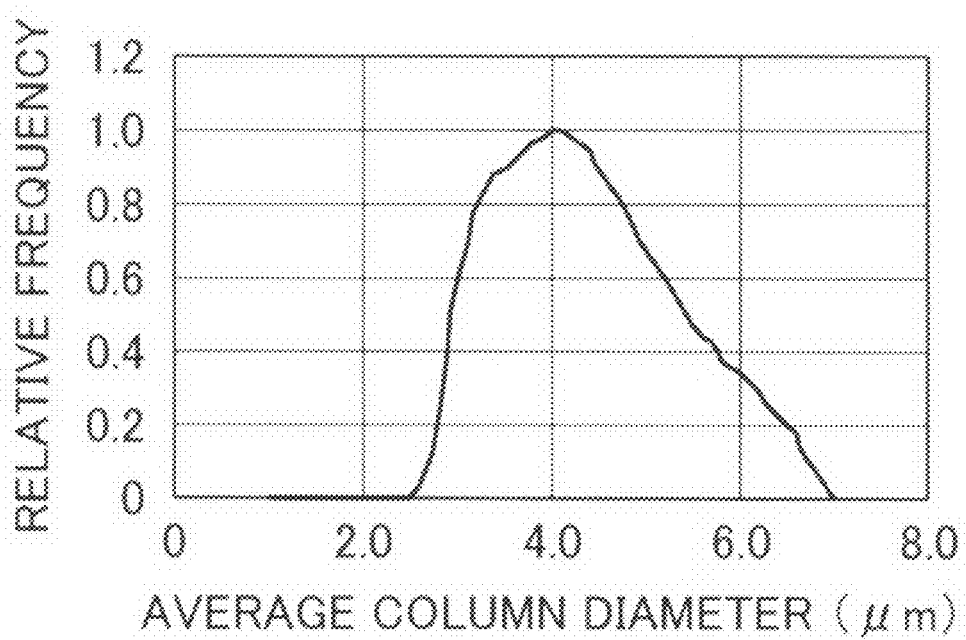
FIG. 11B shows the column diameter distribution of columnar crystals constituting the phosphor layer shown in FIG. 11A.

The column diameter distribution of the prepared conversion panel was obtained in the same manner as in Example 1. One of the electron micrographs of the conversion panel and its column diameter distribution are shown in FIGS. 11A and 11B, respectively. As shown in FIG. 11B, the column diameter distribution of the columnar crystals constituting the phosphor layer of the conversion panel has only one peak.

Comparative Example 2

A conversion panel was prepared by repeating the procedure of Example 1 except that the side length of each square in the grid pattern where a projection is to be formed, the diameter of the projection, and the height of the projection were set to 3 μm, 2.5 μm and 1 μm, respectively.

Figure 12A:
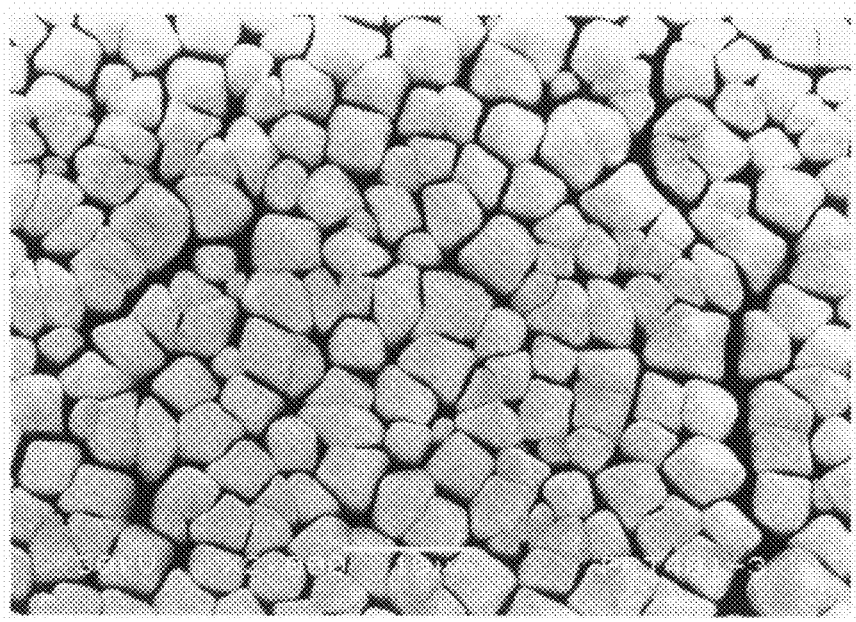
FIG. 12A shows a print image obtained by outputting image data in a micrograph of another phosphor layer in the Comparative Examples of the present invention.
Figure 12B:
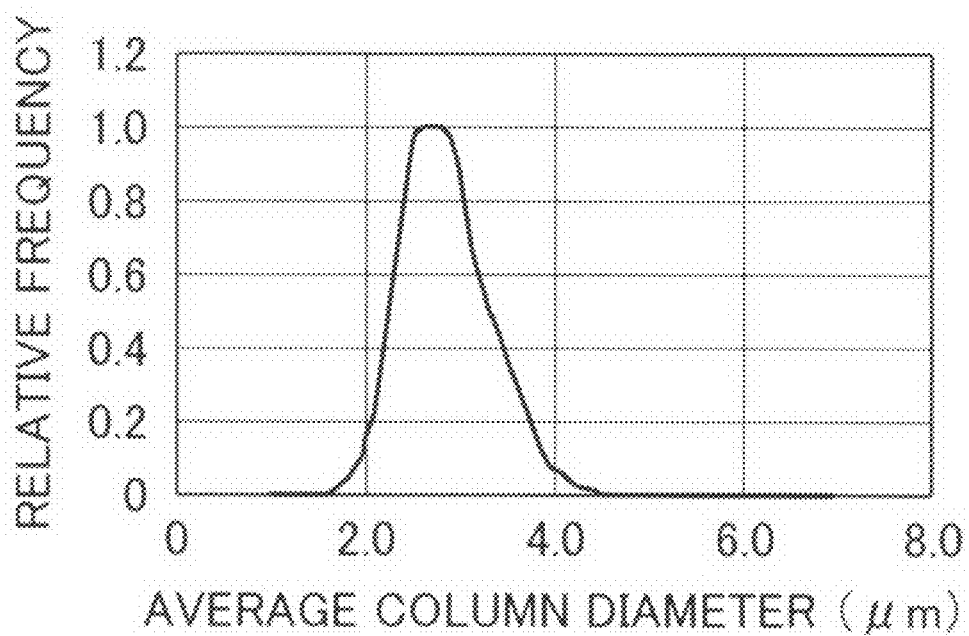
FIG. 12B shows the column diameter distribution of columnar crystals constituting the phosphor layer shown in FIG. 12A.

The column diameter distribution of the prepared conversion panel was obtained in the same manner as in Example 1. One of the electron micrographs of the conversion panel and its column diameter distribution are shown in FIGS. 12A and 12B, respectively. As shown in FIG. 12B, the column diameter distribution of the columnar crystals constituting the phosphor layer of the conversion panel has only one peak.

Each of the conversion panels prepared in Examples 1 to 3 and Comparative Examples 1 and 2 was evaluated for its sensitivity (sensitivity for PSL (photostimulated luminescence)), sharpness (MTF) and detective quantum efficiency (DQE).

(Sensitivity)

Each of the conversion panels 10 was placed in a cassette shielded from light and exposed to about 1 mR of X-rays at a tube voltage of 80 kVp.

After the exposure to X-rays, the conversion panel was taken out of the cassette in the dark and excited with semiconductor laser light (wavelength, 660 nm; 10 mV). The photostimulated luminescence emitted from the phosphor layer was measured with a photomultiplier tube after it was separated from the exciting light by passage through an exciting light cutoff filter (B410 of HOYA CORPORATION).

The sensitivity was evaluated relative to the PSL sensitivity in Comparative Example 1 taken as 100.

(Sharpness)

Each conversion panel whose surface was closely attached to an MTF chart was placed in a cassette shielded from light and exposed to about 10 mR of X-rays at a tube voltage of 80 kVp.

After the exposure to X-rays, the conversion panel was taken out of the cassette in the dark and a radiation image was read in the same manner as in the measurement of the photostimulated luminescence in the evaluation of the PSL sensitivity.

The thus obtained radiation image was reproduced on a display to measure the MTF. The MTF was evaluated relative to that at 1 LP/mm.

(DQC)

Each conversion panel 10 whose surface was closely attached to an MTF chart was placed in a cassette shielded from light and exposed to about 1 mR of X-rays at a tube voltage of 80 kVp. After the exposure to X-rays, the conversion panel was taken out of the cassette in the dark and a radiation image was read in the same manner as in the measurement of the photostimulated luminescence in the evaluation of the PSL sensitivity. The thus obtained radiation image was reproduced on a display to measure the sharpness (MTF).

On the other hand, each conversion panel 10 was placed in a cassette shielded from light and exposed to about 1 mR of X-rays at a tube voltage of 80 kVp. After the exposure to X-rays, the conversion panel was taken out of the cassette in the dark and a radiation image was read in the same manner as above. The thus obtained radiation image was reproduced on a display to measure the granularity (Wiener spectrum).

DQE was calculated from the resulting sharpness and granularity.

The DQE was evaluated relative to that at 1 LP/mm with the result of Comparative Example being taken as 100.

The measurement results are shown in Table 1, below.

TABLE 1

|  | Relative PSL | MTF | Relative DQE |
| --- | --- | --- | --- |
| Example 1 | 106 | 0.62 | 104 |
| Example 2 | 108 | 0.64 | 111 |
| Example 3 | 113 | 0.64 | 116 |
| Comparative Example 1 | 100 | 0.60 | 100 |
| Comparative Example 2 | 93 | 0.61 | 95 |

As shown in Table 1, the conversion panels of the present invention in which the column diameter distribution of the columnar crystals constituting the phosphor layer has two peaks are more excellent in sensitivity, sharpness and DQE (image quality) than the conventional conversion panels in Comparative Examples in which the column diameter distribution has only one peak, and therefore have satisfactory characteristics.

From the foregoing results, the beneficiary effects of the present invention are apparent.

What is claimed is:

1. A radiation image conversion panel comprising:
    a substrate; and
    a phosphor layer of columnar crystals formed on said substrate by vapor-phase deposition, with a column diameter distribution of said columnar crystals having two or more peaks.

2. The radiation image conversion panel according to claim 1, wherein said two or more peaks of said column diameter distribution satisfy Expression:

$0.4R \leq r \leq 0.8R$ wherein R is a column diameter at a largest column diameter peak and r is a column diameter at any one of the remainder in said two or more peaks of said column diameter distribution.

3. The radiation image conversion panel according to claim 1, wherein said phosphor layer comprises a stimulable phosphor represented by a general formula "CsBr:Eu".

4. A process for producing a radiation image conversion panel comprising the steps of:
    preparing a substrate on which two or more types of projections different in diameter are formed and satisfies Expression "$0.4R \leq r \leq 0.8R$" where R is a diameter of a largest projection and r is a diameter of any one of the remainder in said two or more types of projections, thereby making a surface of said substrate uneven; and
    forming a phosphor layer on said uneven surface of said substrate by vapor-phase deposition.

* * * * *